Jan. 20, 1959          W. A. JONES          2,869,860
CLOSURE OPERATOR AND RADIO CONTROL APPARATUS
Filed Jan. 6, 1956          3 Sheets-Sheet 1
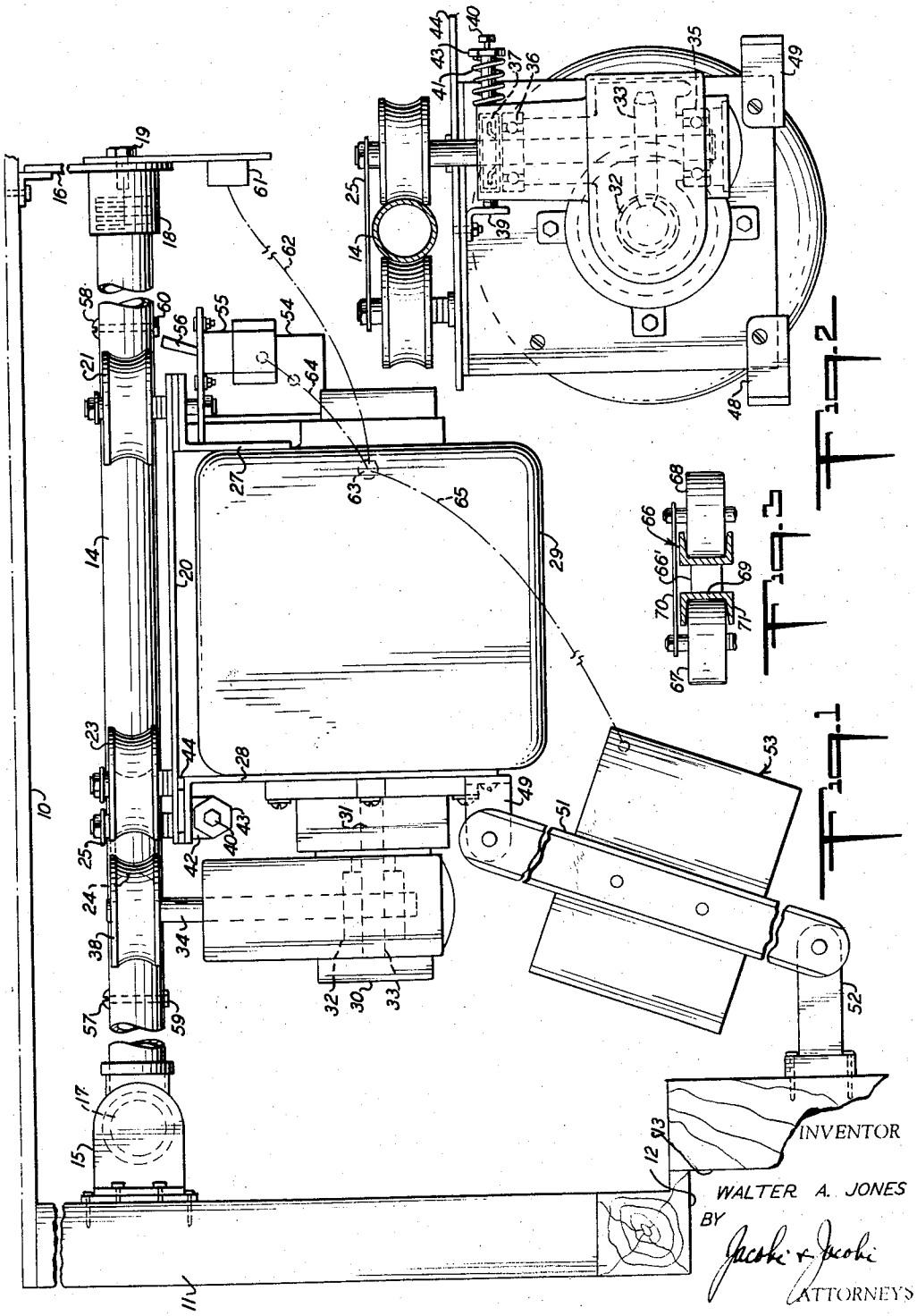
INVENTOR
WALTER A. JONES
BY
ATTORNEYS

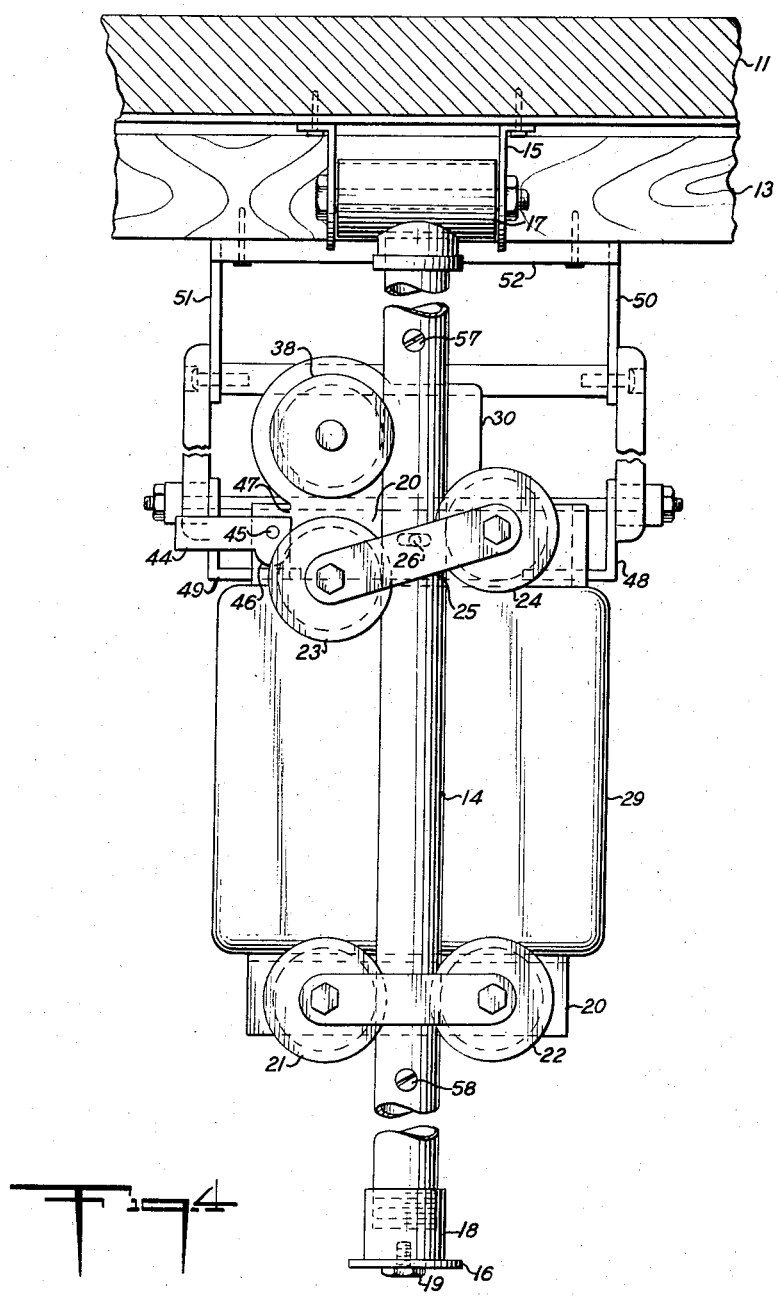

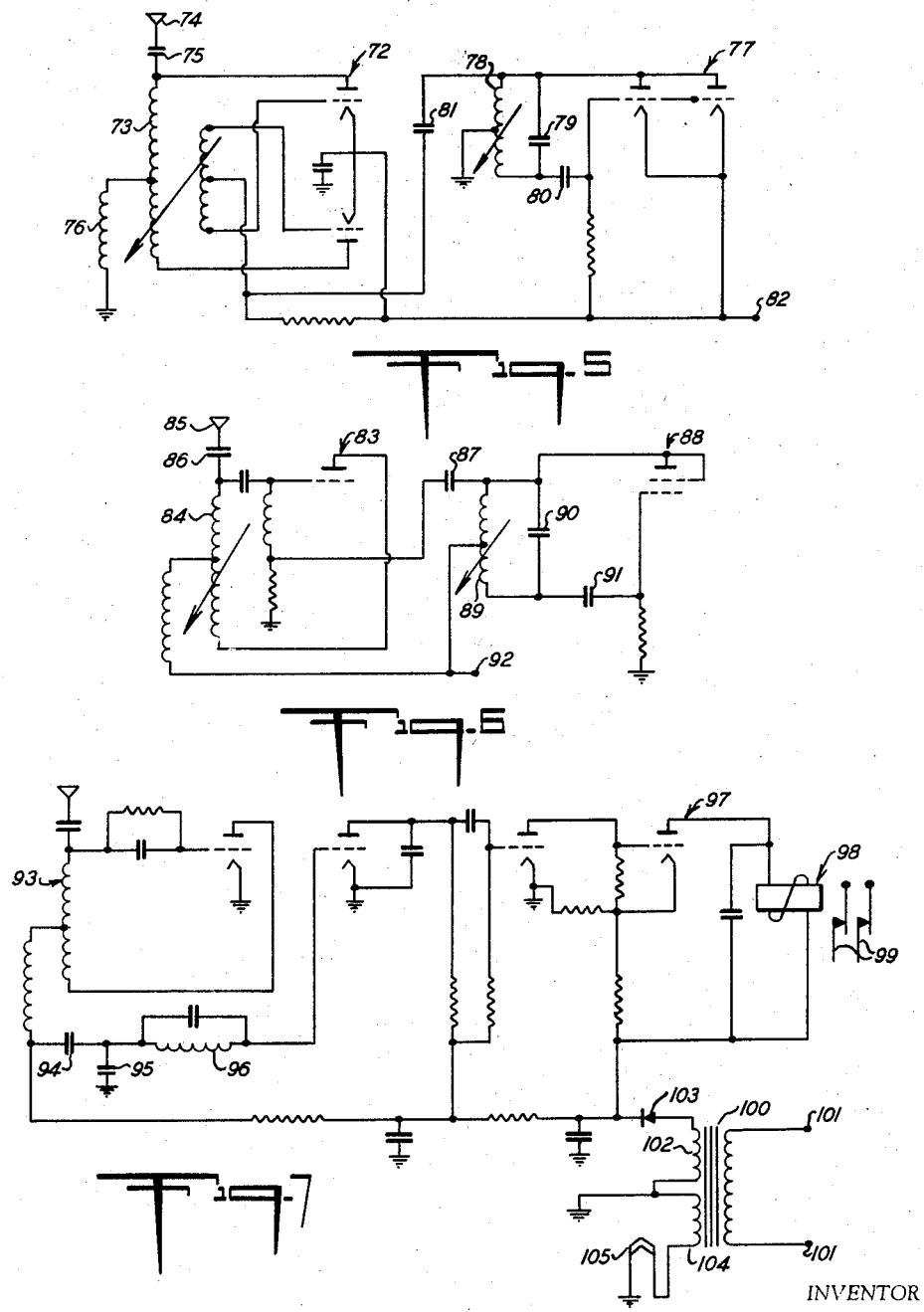

United States Patent Office 2,869,860
Patented Jan. 20, 1959

2,869,860

CLOSURE OPERATOR AND RADIO CONTROL APPARATUS

Walter A. Jones, Edgewater, N. J., assignor to Edythe Kendall, New York, N. Y.

Application January 6, 1956, Serial No. 557,661

2 Claims. (Cl. 268—59)

This invention relates to building construction and more particularly to a power operator for overhead sliding doors or the like, and a radio control apparatus for controlling the operation of the closure operator from a moving vehicle or other remote point.

Heretofore, many different types of radio controlled closure operators have been proposed and utilized, but these were relatively costly, cumbersome and difficult to install and furthermore, many of these could not be installed on existing doors, but required the installation of an entirely new door assembly. Furthermore, the radio control apparatus heretofore utilized did not discriminate sufficiently between legitimate signals for operating the door and extraneous signals or noise emanating from power lines and the like. As a result, doors were often opened or closed without warning or authorization, thereby rendering the system undependable and to a large extent destroying the utility and convenience thereof.

It is accordingly an object of this invention to provide a closure operator which may be conveniently and economically installed for use with present overhead sliding doors, such installation being relatively simple and not requiring highly skilled technicians.

A further object of the invention is the provision of a closure operator for overhead sliding doors or the like, requiring only the installation of a single track above the door, which track may comprise a length of pipe or a beam and a single connection to the door substantially midway of the width thereof.

A still further object of the invention is the provision of a closure operator for overhead sliding doors or the like, which may be lubricated for life and due to the novel drive arrangement, will require little, if any, service or maintenance.

Another object of the invention is the provision of a closure operator for an overhead sliding door or the like, which may be installed without modification of the existing door installation and in which the power unit travels on a single track thereby eliminating chains or belts which materially lowers installation and maintenance costs and eliminates failures due to foreign objects becoming entangled in such chains or belts.

A further object of the invention is the provision of a closure operator for overhead sliding doors or the like, including a power unit traveling on a single track to open or close the door with the track consisting of a length of pipe or a beam and which may be conveniently adapted to any size of door merely by providing the proper length of track.

A still further object of the invention is the provision of a radio transmitter for installation in a vehicle or at a remote point to control the operation of a closure operator, which transmitter generates a signal at a given carrier frequency modulated by a pulse of a given frequency and given wave form, which transmitter operates on a plate voltage of not greater than twelve volts.

Another object of the invention is the provision of a radio transmitter for controlling the operation of a closure operator, which transmitter may be conveniently housed in a relatively small container and conveniently installed in a motor vehicle and operated from the battery of the motor vehicle without interfering with the normal operation of the conventional vehicle radio.

A further object of the invention is the provision of a radio receiver for controlling the operation of a closure operator, which receiver will respond only to a signal of a given carrier frequency and pulse modulated at a given frequency and with a given wave form.

A still further object of the invention is the provision of a radio receiver for controlling the operation of a closure operator, which receiver is non-responsive to extraneous radio signals or noise and remains inactive, except upon reception of an authorized control signal.

Further objects and advantages of the invention will be apparent from the following description taken in conjunction with the accompanying drawing wherein:

Fig. 1 is a view in side elevation showing a portion of an overhead sliding door and a closure operator constructed in accordance with this invention and installed in operative position;

Fig. 2 an end elevational view of the closure operator and track shown in Fig. 1;

Fig. 3 a fragmentary end elevational view showing a different form of track;

Fig. 4 a top plan view of the door and closure operator shown in Fig. 1;

Fig. 5 a schematic diagram of a radio transmitter for use with the closure operator of this invention;

Fig. 6 a schematic diagram of a miniature transmitter suitable for carrying in the pocket and for use with the closure operator of this invention; and Fig. 7 a schematic diagram of a radio receiver for use in conjunction with the closure operator of this invention and for receiving control signals from the radio transmitter shown in Figs. 5 or 6.

With continued reference to the drawing and particularly Fig. 1, there is shown a portion of a building having a ceiling 10, an end wall 11 having a door opening 12 therein and the upper portion of a door 13 of the type commonly referred to as an overhead sliding door and which is usually mounted on side tracks, not shown.

The closure operator of this invention may well include an elongated track 14, which as shown in Figs. 1 and 2, may comprise a length of pipe or tubing and the track 14 may be secured to the end wall 11 of the building by a suitable bracket 15 with the opposite end of the track 14 secured to the ceiling 10 by a depending bracket 16. The track 14 may, of course, be of any suitable length which is determined in accordance with the height of the door 13. The bracket 15 may be provided with a pivotal mounting 17 for the end of the track 14 in order that such track may if desired, or necessary be disposed at an inclination and the bracket 16 may be provided with a fitting 18 for receiving the opposite end of the track 14 with the fitting 18 adjustably secured to the bracket 16 by screw threaded fastening means or the like 19. The above described mounting means for the track 14 permits installation of such track regardless of the special conditions which may be encountered during such installation.

A carriage 20 is provided with a pair of grooved rollers 21 and 22 engaging the track 14 on opposite sides thereof and adjacent the opposite end of the carriage 20 there is mounted a pair of grooved rollers 23 and 24 also engaging the track 14 on opposite sides thereof. If desired, the rollers 23 and 24 may be connected by a link 25, which in turn is pivotally mounted at 26 on the carriage 20 and the link 25 may be resiliently urged in one direction about the pivot 26 in order to hold the rollers 23 and 24 in engagement with the track 14. The specific arrangement for urging the link 25 in one direction is not shown and any suitable means for this purpose may be employed. It will thus be seen that by the above described arrangement, the carriage 20 is suspended from the track 14 and is free to move therealong in either direction.

Suspended from the carriage 20 by suitable brackets 27 and 28 is an electric motor 29 to the end bell of which is attached a gear box 30. The drive shaft 31 of the motor 29 is provided with a worm gear 32 which meshes with a worm wheel 33 mounted on a vertical shaft 34 journaled in anti-friction bearings 35 and 36 mounted in the gear housing 30. A suitable seal 37 may be provided in the upper end of housing 30 to prevent leakage of lubricant therefrom. Fixed upper end of shaft 34 is a grooved drive roller 38 which is urged into engagement with the track 14 by a mechanism to be described.

Bracket 27 supporting one end of the motor 29 may be pivotally or slidably mounted on the carriage 20 for pivotal or transverse movement with relation thereto and the other bracket 28 supporting the opposite end of the motor 29 is slidably mounted on the carriage 20 for transverse movement with relation thereto. An angle bracket 39 is fixed to the carriage 20 and secured to the bracket 39 is a bolt 40 which serves to receive a compression spring 41, one end of which engages a lug 42 attached to the bracket 28 and the opposite end engages an adjusting nut 43 received on the bolt 40. It will therefore be seen that as a result of the compression of spring 41, that the bracket 28 and motor 29 carried thereby will be urged transversely of the carriage 20 and yieldably hold the driving roller 38 in engagement with the track 14. The pressure exerted by the spring may, of course, be adjusted by the nut 43.

While the driving roller 38 will normally be in engagement with the track 14, it may be desirable at times, particularly during repairs or maintenance of the unit, to move such roller out of engagement with track 14 and for this purpose, there is provided a cam lever 44 pivotally mounted at 45 on the bracket 28 and the lever 44 is provided with a cam portion, which, as shown in Fig. 4, will upon counter-clockwise movement of the lever 44 engage the side 47 of the carriage 20 to urge the bracket 28 and motor 29 transversely of the carriage and thereby move the driving roller 38 out of engagement with the track 14.

Secured to the lower end of bracket 28 are spaced bracket members 48 and 49 and pivotally attached to these members are links 50 and 51 respectively, which in turn are pivotally attached to a bracket 52 secured to the door 13 adjacent the upper edge thereof and substantially midway of the width of such door. Mounted between the links 50 and 51 and secured thereto is a radio receiver 53, the construction and operation of which will be later described.

Mounted on the carriage 20 is a power relay 54 for energizing and de-energizing the motor 29 and also mounted on the carriage 20 is a reversing switch 55 having an actuating member 56 projecting upwardly therefrom. Extending through the track 14 adjacent opposite ends thereof are limit stops 57 and 58 and such stops are provided with members 59 and 60 respectively disposed in the path of movement of the switch actuating member 56. If desired, of course, the pins 57 and 58 may be replaced by suitable clamp members received about the track 14, rather than extending through holes therein.

Supported on the ceiling bracket 16 is a cable reel 61 of the type which automatically retracts the cable carried thereby and a cable 62 leads from such reel 61 to a junction box 63 mounted on the motor 29 or at any other suitable location on the carriage 20. An electrical cable 64 leads from the junction box 63 to the power relay 54 and the reversing switch 55 and another electrical cable 65 is connected between the junction box 63 and the radio receiver 53. A suitable source of electrical power, such as the building wiring system will, of course, be connected to the cable 62 at the cable reel 61.

While the track 14, as shown in Figs. 1 and 2, may comprise a length of pipe or tubing, if desired, such pipe may be replaced as shown in Fig. 3, by a beam 66 fabricated from channels placed back to back in spaced relationship and where a beam of such configuration is utilized for a track, rollers 67 and 68 supporting the carriage 20 therefrom would, of course, not be grooved as in the form above described, and likewise, the driving roller frictionally engaging the web 69 of the beam 66 between the flanges 70 and 71 would not be grooved, but would have a flat outer surface for frictionally engaging such web. Either form of track may be used, depending upon the particular requirements of the particular installation. Switch actuating means 66' may be positioned between the webs of the beam 66 at any desired location.

It will be seen that by the above described invention there has been provided a closure operator requiring only a single track and in which the power unit moves along the track in either direction to open or close the door and in which operation may be entirely automatic in response to a signal received by the radio receiver attached thereto. The mechanical details of construction are relatively simple and it will be seen that the entire unit may be conveniently and economically manufactured and installed without modification or alteration of the present door installation. The closure operator of this invention is, of course, likewise applicable to new installations and it is not necessary to provide extra clearance above the door or any other special provisions to permit installation of the closure operator of this invention. The operation of this device will be more fully described in connection with the operation of the radio control apparatus.

With particular reference to Fig. 5, there is shown a radio transmitter suitable for use as a remote radio control for the closure operator of this invention. This transmitter is conventional, insofar as basic circuit is concerned, but the components thereof are so selected that the transmitter will operate and provide a usable signal output with a plate voltage not exceeding twelve volts which means that the transmitter may be utilized in a motor vehicle having either a six or twelve volt electrical system and without necessitating the use of a vibrator power supply or other means to raise the voltage of the automobile electrical system to a relatively high level.

The transmitter shown in Fig. 5 is intended to operate at a relatively high frequency and comprises a double triode tube 72 operating as a self-excited push pull oscillator and in conjunction therewith there is provided a plate inductance 73 and a grid inductance 74. These two inductances are wound on a common slug tuned coil form, in order to provide the proper coupling therebetween and a tuning means for the output of the transmitter. The plate inductance 73 is coupled to a suitable antenna 74 through a coupling condenser 75. An R. F. choke 76 is connected to the midpoint of the plate inductance 73 and where the positive side of the vehicle electrical system is grounded, the choke 76 is also connected to ground. In systems where the negative side of the electrical system is grounded the choke 76 would be connected to the positive side of the system.

The oscillator section of the transmitter shown in Fig. 5, generates a carrier of a given frequency and such carrier is pulse modulated at a given frequency and wave form by means of a modulator incorporating a double triode tube 77 with the sections thereof connected in parallel and with a tunable inductance 78 connected in the plate circuit. The tunable inductance 78 determines the frequency of the modulation pulse and in conjunction with condensers 79 and 80 provides a pulse of a predetermined wave form. The output of the modulator tube 77 is coupled to the grid inductance 74 of the oscillator 72 through a coupling condenser 81. In electrical systems where the positive side is grounded, the negative side is connected to the transmitter at the point 82 and in systems where the negative side is grounded, the positive side thereof would be connected to the point 82. It will, therefore, be seen that there is provided by the above described transmitter an apparatus for generating a radio control signal of a given carrier frequency and pulse modulated at a given frequency and a given wave form and when utilized in conjunction with a receiver to be described, there is provided a radio control system which will discriminate against extraneous signals and noise and which will operate at all times to control the closure operator, above described. Furthermore, the transmitter as above described, may be housed in an extremely small and compact container and, such transmitter will operate on the normal six or twelve volt vehicle electrical system thereby eliminating the presence of high voltage and the necessity for utilizing components which will withstand such high voltage. This results in economy of manufacture and also materially reduces the chances of failure due to component breakdown resulting from the application of high voltages thereto.

A somewhat modified form of transmitter is shown in Fig. 6 and the components thereof are such that the transmitter may be of extremely small size of the order of the size of a king size pack of cigarettes and the components utilized are in general of the type found in hearing aids.

In the transmitter shown in Fig. 6, a self-excited oscillator is employed utilizing a triode tube 83 to the plate circuit of which is attached a tunable plate inductance 84 which in turn is coupled to a suitable antenna 85 through a coupling condenser 86. Coupled to the grid circuit of the oscillator tube 83 through a coupling condenser 87 is a pulse modulator circuit including a modulator tube 88 provided with a tunable plate inductance 89 which in conjunction with condensers 90 and 91 provides a modulating pulse of given frequency and wave form. In this transmitter a plate voltage of the order of forty-five volts is utilized and this may be provided from suitable miniature batteries with the positive side thereof connected to the transmitter at the point 92. The transmitter shown in Fig. 6 is intended as a pocket size device which may be carried on the person or in a ladies purse and may be utilized to control the closure operator described above, in lieu of the transmitter shown in Fig. 5 and which is intended as a permanent installation in a motor vehicle.

With particular reference to Fig. 7, there is shown a receiver intended to be used as a control apparatus for the closure operator described above, and to be housed in the casing 53 shown in Fig. 1 of the drawing. The receiver shown in Fig. 7 is largely conventional, except that there is provided in conjunction with the input circuit 93, a filter circuit comprising condensers 94 and 95 and an inductance 96 which serves to discriminate against a modulated signal in which the modulation pulse is of a difference frequency or wave form from that provided by the transmitters described above. The input circuit 93, of course, will discriminate against carrier frequencies other than those for which the apparatus is adjusted.

The output tube 97 of the receiver is provided with a control relay 98 connected in plate circuit thereof and during operation of the receiver, normal noise in the receiver circuit will bypass the output tube 97 to cut off in which condition the contact 99 of the control relay 98 remain open. Upon reception of an authorized signal of a predetermined carrier frequency and predetermined pulse modulation frequency and wave form, such signal will pass through the circuit quieting the normal circuit noise and rendering the output tube 97 conductive. As a result of the current flowing in the plate circuit of the tube 97, the control relay 98 will be energized to close the contacts 99 thereby initiating operation of the closure operator above described.

The receiver shown in Fig. 7 may be supplied with suitable operating voltages through a transformer 100 connected at 101 to a suitable source of A. C. current and a high voltage secondary winding 102 on the transformer 100 is connected through a selenium rectifier 103 and a suitable filter to the high voltage portions of the receiver circuit. There may also be supplied a low voltage secondary winding 104 on the transformer 100 to supply the heaters for filaments 105 of the vacuum tubes utilized in the receiver circuit.

It will thus be seen that there has been provided a receiver which will operate only in response to signals emanating from the transmitters, above described, and in which the transmitters and receiver are so adjusted as to receive and transmit a control signal of a given carrier frequency and pulse modulated at a given frequency and wave form and, such receiver will adequately discriminate against other signals and also against extraneous noises which might tend to operate the control relay. No special components are required for construction of the receiver and the same may be relatively compact and the current requirements thereof are extremely low, thereby permitting continuous operation of the same without undue operating costs.

By the above described invention, there has been provided a relatively simple and economical closure operator, together with a suitable and highly effective radio control apparatus therefor and, as fully described above, the operation of such apparatus is completely fool-proof thereby preventing other than authorized operation of the closure operator.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A closure operator in combination with an overhead sliding door; comprising a single elongated track mounted above said door and extending in the direction of movement thereof, a carriage mounted on said track for movement therealong, a motor mounted on said carriage, a friction driving wheel carried by said motor and driven thereby, resilient means carried by said motor holding said driving wheel in frictional engagement with said track, link means connecting said carriage and said door adjacent the upper edge of said door, a radio receiver including a control relay mounted on said link means, a power relay for energizing and de-energizing said motor, said power relay being mounted on said carriage, said control relay being operatively electrically connected to said power relay, a motor reversing switch mounted on said carriage, switch operating means engageable by said switch, said switch operating means being mounted on said track at the limits of travel of said carriage in each direction, said switch being electrically operatively connected to said power relay so that upon closing of said control relay in response to a radio signal picked up by said receiver, said power relay will close and will energize said motor to move said carriage and motor along said track to selectively open and close said door, and upon reaching the limits of travel of said carriage said switch operating means will actuate said switch to open said power relay and de-energize said motor and reverse the connections to said motor for movement of said carriage in the opposite direction upon reception of another radio signal by said receiver.

2. A closure operator in combination with an overhead sliding door; comprising a single elongated track mounted above said door and extending in the direction of movement thereof, a carriage having a plurality of rollers, said rollers being engaged with said track for movement of said carriage along said track, a motor suspended from said carriage and mounted for limited movement transversely of said carriage, a friction driving wheel carried by said motor and driven thereby, adjustable means carried by said motor yieldably holding said driving wheel in frictional engagement with said track, means connected to said driving wheel for selectively disengaging said driving wheel for said track, spaced links connecting said carriage and said door, a radio receiver including a control relay mounted between said links, a power relay for energizing and de-energizing said motor mounted on said carriage and connected to said motor, electrical connections between said control relay and said power relay, a motor reversing switch mounted on said carriage, switch operating means engageable by said switch extending through said track at the limit of travel of said carriage in each direction, said switch being electrically connected to said power relay, a retractable cable reel mounted adjacent one end of said track, and an electrical cable carried by said reel and connected to said switch and power relay whereby upon closing of said control relay in response to a radio signal picked up by said receiver said power relay will close and energize said motor to move said carriage and motor along said track to open or close said door and upon reaching the limit of travel of said carriage said switch operating means will operate said switch to open said power relay and de-energize said motor and reverse the connections to said motor for movement in the opposite direction upon reception of another radio signal by said receiver.

References Cited in the file of this patent

UNITED STATES PATENTS

| | | |
|---|---|---|
| 1,760,479 | Colman | May 27, 1930 |
| 1,952,681 | Peelle | Mar. 27, 1934 |
| 2,001,747 | Runge | May 21, 1935 |
| 2,052,911 | Weathers | Sept. 1, 1936 |
| 2,415,929 | Bond | Feb. 18, 1947 |
| 2,430,729 | Negri | Nov. 11, 1947 |
| 2,533,116 | Jenkins | Dec. 5, 1950 |
| 2,533,285 | Sager | Dec. 12, 1950 |
| 2,575,782 | Bartelink | Nov. 20, 1951 |
| 2,588,879 | Richards | Mar. 11, 1952 |
| 2,597,013 | Marchetti | May 20, 1952 |
| 2,703,236 | Verdier | May 1, 1955 |
| 2,752,150 | Richmond et al. | June 26, 1956 |